(12) United States Patent
Damron (10) Patent No.: US 7,203,820 B2
(45) Date of Patent: Apr. 10, 2007

(54) EXTENDING A REGISTER FILE UTILIZING STACK AND QUEUE TECHNIQUES

(75) Inventor: Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 621 days.

(21) Appl. No.: 10/185,200

(22) Filed: Jun. 28, 2002

(65) Prior Publication Data

US 2004/0003211 A1    Jan. 1, 2004

(51) Int. Cl.
 *G06F 12/00* (2006.01)
(52) U.S. Cl. .................................................. 712/228
(58) Field of Classification Search ............... 712/219, 712/228; 711/2
 See application file for complete search history.

(56) References Cited

U.S. PATENT DOCUMENTS

| | | | | |
|---|---|---|---|---|
| 4,030,077 | A | * | 6/1977 | Florence et al. ............. 712/300 |
| 4,334,269 | A | * | 6/1982 | Shibasaki et al. ........... 712/202 |
| 4,835,738 | A | * | 5/1989 | Niehaus et al. ............. 711/154 |
| 5,241,679 | A | * | 8/1993 | Nakagawa et al. ......... 710/260 |
| 5,355,465 | A | * | 10/1994 | Yoshida ..................... 711/200 |
| 5,680,632 | A | * | 10/1997 | Studor et al. ................ 712/43 |
| 5,991,531 | A | * | 11/1999 | Song et al. .................. 703/26 |
| 6,014,739 | A | * | 1/2000 | Christie .................... 712/228 |
| 6,035,391 | A | * | 3/2000 | Isaman ...................... 712/222 |
| 6,134,573 | A | | 10/2000 | Henry et al. |
| 6,141,673 | A | * | 10/2000 | Thayer et al. ............... 708/402 |
| 6,542,862 | B1 | * | 4/2003 | Safford et al. ................ 703/26 |
| 6,865,663 | B2 | * | 3/2005 | Barry ......................... 712/34 |

FOREIGN PATENT DOCUMENTS

| WO | WO 97/22921 | 6/1997 |
|---|---|---|
| WO | WO 01/61475 | 8/2001 |

OTHER PUBLICATIONS

InstantWeb Online Computing Dictionary, www.instantweb.com/d/dictionary/foldoc.cgi, 1994-1999, Infostreet Inc, "trap".*
C++Program Design, James P Cohoon and Jack W Davidson, McGraw-Hill, 1999, 2nd Edition, p. 487.*

(Continued)

*Primary Examiner*—Eric Coleman
(74) *Attorney, Agent, or Firm*—Darby & Darby PC; David Chin (57) ABSTRACT

In a set of registers, each individually addressable by register operations using a corresponding register identification, at least one register of the set of registers is an extended register having multiple storage locations. Values stored in the multiple storage locations are accessed, for example, according to the order in which they have been stored. Less than all of the multiple storage locations are accessible by a register operation at a given time. Older versions of software that do not recognize extended registers identify the extended register as having only one storage location. An extended register can be, for example, a stack register, a queue register, or a mixed register and values stored in the multiple storage locations are read and stored according to the characteristics of the register.

63 Claims, 7 Drawing Sheets

OTHER PUBLICATIONS

Kiyohara, Tokuzo, *"Register Connection: A New Approach to Adding Registers into Instruction Set Architectures"*, Proceedings of the Annual International Symposium on Computer Architecture, May 1993.

Coates, William S., et al., "FLEETzero: An Asynchronous Switching Experiment," 2001 IEEE, pp. 173-182.

Frank, Matthew et al, "SUDS: Primitive Mechanisms for Memory Dependence Speculation," MIT/LCS Technical Memo, LCS-TM-291, Jan. 6, 1999, Cambridge, MA, pp. 1-9.

Honesty C. Young and James R. Goodwin, "The Design of a Queue-based Vector Supercomputer", IEEE, pp. 483-486, Aug. 1986.

* cited by examiner

| ASSEMBLY INSTRUCTION | DESCRIPTION |
|---|---|
| pop   regID | pop a value off the top of stack identified by regID |
| pop   regID, N | pop N values off the top of stack identified by regID |
| pop   regID A, N, regID B | pop N values off the top of stack identified by regID A, put last value popped into register identified by regID B |
| pop   %o1   1, %g0 | pop one value off the stack and throw it away |

EXTENDING A REGISTER FILE UTILIZING STACK AND QUEUE TECHNIQUES

BACKGROUND

1. Field of the Invention

The invention relates to register usage in a processor, and in particular, the expansion of a register set through the use of stacks and/or queues.

2. Description of the Related Art

Computer systems typically include, amongst other things, a memory system and one or more processors and/or execution units. The memory system serves as a repository of information, while a processor reads information from the memory system, operates on the information, and stores results to the memory system.

Processors have a large number of internal registers, with the objective of providing enough registers that most program data can be supplied from this high-speed, local storage. Register usage is an important resource allocation issue for compilers. A compiler is responsible for translating a high-level-language program into code that can be efficiently executed by the processor. This requires that the compiler allocate registers to program variables to reduce the communication with the memory system. In general, the goals of register allocation and of software scheduling are at odds with one another. The register allocator wants to allocate as few registers to as much data as possible to decrease the possibility that there will not be enough registers. On the other hand, the scheduler wants to maintain as many independent computations as possible, meaning that additional registers are needed to store the intermediate results of parallel computations.

When internal registers are full, operands and results typically stored locally must be stored in the memory system. However, memory access is much slower than register-to-register operations. Computer performance can be greatly enhanced if unnecessary memory accesses can be eliminated and faster internal register operations can be utilized.

Processor speeds and parallelism continue to increase, also causing local storage requirements to increase. An efficient compiler will produce more parallel operations to keep the processor at optimum performance. However, each of these parallel operations requires storage for operands and results. Again, when internal registers are full, operands and results typically stored locally must be stored in the memory system.

A simple solution to enhance computer performance would be to add additional internal registers. Unfortunately, the number of internal registers available for local storage is often limited by the instruction set. An instruction typically includes an opcode to identify the instruction, several register identification fields for identifying registers to supply operands and store results, and occasionally an immediate value field to supply a constant value as an operand. Typically, register identification fields are limited to a small finite number of bits limiting the overall number of unique register identifiers. For example, a single 5 bit register identifier field in an instruction used to identify a specific internal register limits the architecture to a maximum of 32 internal registers. Modification of the instruction set to expand the number of bits in the register identifier field could be performed, but this solution would break backward compatibility with older versions of software. In other words, the expanded register identifier field would result in previous generation code that could not be executed on new processors. Work-arounds are available, but often involve an operating system to trap on certain conditions, introducing significant overhead in processing time and memory space.

Another possible solution would be to utilize new opcodes that identify additional internal registers. By using several values of the opcode, bits of the opcode can be utilized to identify each new register. However, opcodes are limited to a certain number of bits, limiting the total number of available values and therefore instructions. Using opcode space to address new internal registers is an undesirable solution because a large portion of the limited instruction encoding values must be used.

A solution is needed to provide additional internal registers to a processor architecture without breaking backward compatibility and without utilizing large amounts of opcode space.

SUMMARY

Accordingly, it has been discovered that even within the confines of a instruction set architecture that defines a limited number of addressable registers, additional virtual register storage can be provided by extending one or more of the addressable registers to have multiple storage locations. In this way, a larger set of available register storage locations can be provided for use by register-hungry applications. Additional register transfer instructions or operations can be defined to manage the extended register. In some processor implementations, a large amount of additional storage can be provided, e.g., 32, 128, . . . 8K, or more, can be implemented. Techniques of the present invention may be employed with or without support for other register management techniques, such as register windowing (overlapped or otherwise).

Accordingly, in one embodiment, a processor includes a set of registers, each individually addressable by register operations executable on the processor using a corresponding register identification. At least one register of the set of registers is an extended register that has multiple storage locations.

In another embodiment, values stored in the multiple storage locations of the extended register are only accessible according to the order in which the values have been stored.

In another embodiment, less than all of the multiple storage locations are accessible by each of the register operations.

In another embodiment, one or more of the register operations identify the at least one register as having only one storage location.

In another embodiment, the extended register is a stack register; wherein a sequence of values written to the stack register are stored in a plurality of the multiple storage locations such that a last value written is stored at a top of the stack register; and wherein a read of the stack register is from the top of the stack register.

In another embodiment, the extended register is a queue register; wherein a sequence of values written to the queue register are stored in a plurality of the multiple storage locations such that a value enqueued to the queue register is stored at a back of the queue register and a read from the queue register is from a front of the queue register.

In another embodiment, a trap operation is initiated when a read operation accesses the extended register when all of the multiple storage locations are empty.

In another embodiment, a trap operation is initiated when a write operation accesses the extended register when all of the multiple storage locations are full.

In another embodiment, one of the register operations rearranges an order of values stored in the multiple storage locations.

In another embodiment, one of the register operations tests whether all of the multiple storage locations are empty, and if so, enables a conditional execution.

In another embodiment, one of the register operations tests whether all of the multiple storage locations are full, and if so, enables a conditional execution.

In another embodiment, the extended register is a mixed register wherein a sequence of values written to the mixed register are stored in a plurality of the multiple storage locations such that a value written is stored at a front of the mixed register; and wherein a read of the mixed register reads the value at the front of the mixed register.

In another embodiment, the processor includes an extended register size control and wherein one or more of the register operations identify the extended register as having only one storage location, and wherein the one or more register operations operate without error when the extended register size control is set to one.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows presents a series of systems, apparati, methods and techniques that facilitate additional local register storage through the use of a an extended register set in a processor. While much of the description herein assumes a single processor, process or thread context, some realizations in accordance with the present invention provide expanded internal register capability customizable for each processor of a multiprocessor, each process and/or each thread of execution. Accordingly, in view of the above, and without limitation, certain exemplary exploitations are now described.

Figure 1:
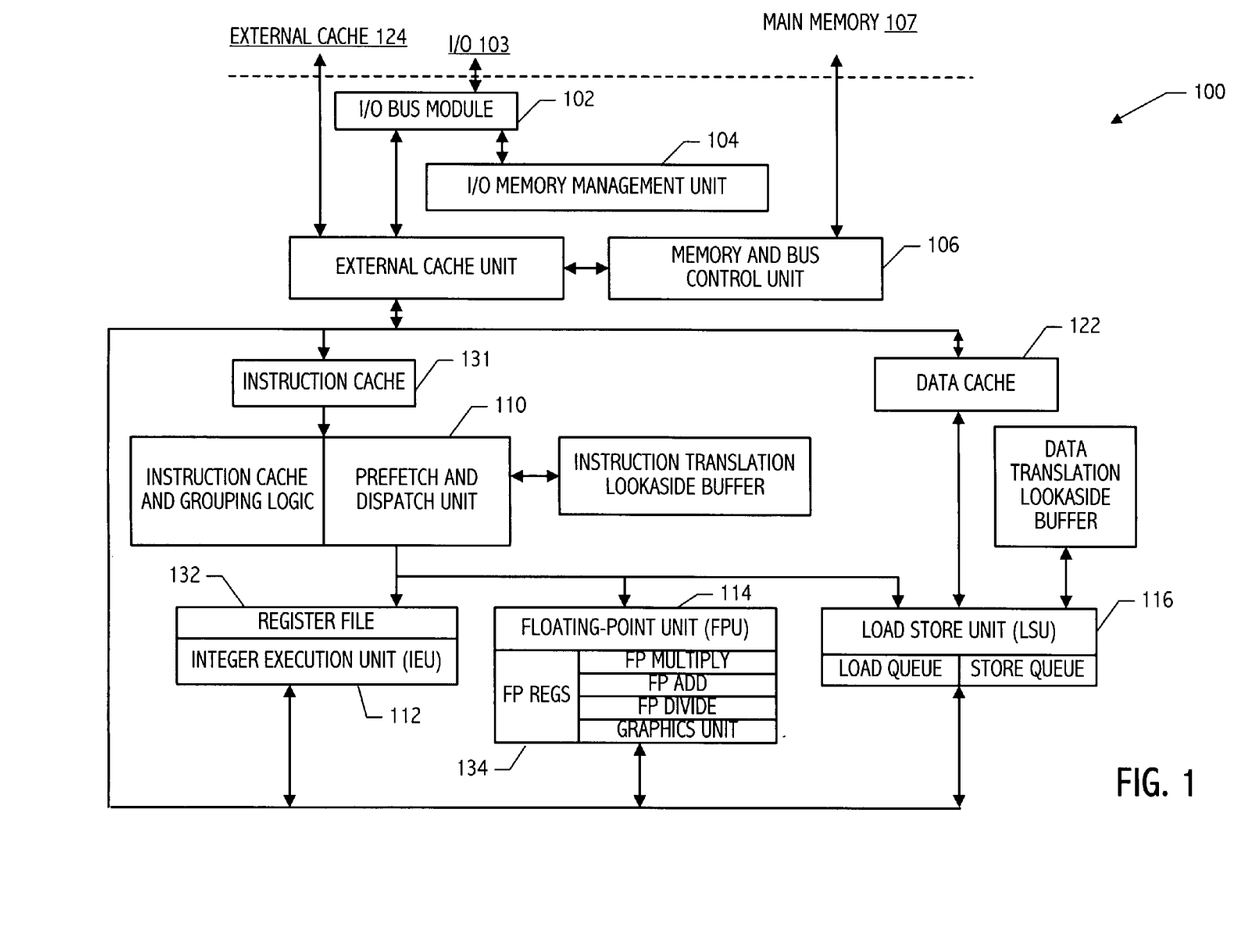
FIG. 1 is a block diagram depicting an illustrative processor architecture that includes various internal register sets and in which techniques of the present invention can be employed to provide additional internal register storage in accordance with some embodiments of the present invention.

FIG. 1 is a block diagram depicting an illustrative processor architecture that includes various internal register sets and in which techniques of the present invention can be employed to provide additional internal register storage in accordance with some embodiments of the present invention. Processor 100 integrates an I/O bus module 102 to interface directly with an I/O bus 103, an I/O memory management unit 104, and a memory and bus control unit 106 to manage all transactions to main memory 107. A Prefetch and Dispatch Unit (PDU) 110 ensures that all execution units, including an Integer Execution Unit (IEU) 112, a Floating Point Unit (FPU) 114, and a Load-Store Unit (LSU) 116, remain busy by fetching instructions before the instructions are needed in the pipeline. A memory hierarchy of processor 100 includes a data cache 122 associated with LSU 116 as well as an external cache 124, main memory 107 and any levels (not specifically shown) of additional cache or buffering. Instructions can be prefetched from all levels of the memory hierarchy, including instruction cache 131, external cache 124, and main memory 107.

IEU 112 can include multiple arithmetic logic units for arithmetic, logical and shift operations, and one or more integer multipliers and dividers. IEU 112 is also integrated with a multi-window internal register file 132 utilized for local storage of operands.

Internal register file 132 has, for example, 32 64-bit registers which are addressed utilizing a 5-bit register identifier field in an integer instruction. Internal register file 132 is partitioned, for example, into 4 sets of 8 registers: in, out, local, and global registers. The in and out registers are typically used for passing parameters to and receiving results from subroutines, and for keeping track of the memory stack. A procedure can store a temporary value in an out register with the understanding that the value is volatile across procedure calls. A function returns a scalar integer value by writing the scalar integer value into an in register. The local registers are typically used for automatic variables and for most temporary values. For access efficiency, a compiler can also copy parameters from the memory stack into the local registers and use them from there. Typically, the global registers are used for temporaries, global variables, or global pointers, such as either user variables or values maintained as part of a program's execution environment. For example, one could use global registers in the execution environment by establishing a convention that global scalars are addressed via offsets from a global base register.

Local, in and out registers can have register windows controlled by SAVE and RESTORE instructions. A register window defines a current portion of a much larger register set, wherein only that current portion is accessed at a given time. For example, internal register file 132 can have eight windows of 16 registers with only 24 registers accessible at any one time. The current window is given by the current window pointer (CWP) register. The CWP is decremented by the RESTORE instruction and incremented by the SAVE instruction. SAVE and RESTORE instructions move window the up and down like a stack. Register windows are used to pass parameters between functions. Register windowing expands the amount of storage provided by the internal register set. However, only a portion of that storage is available at any given time. Additionally, SAVE and RESTORE instructions tend to be slow operations. Further, if all internal storage is full, an overflow condition occurs which causes the processor to generate a trap. On a trap, the Operating System (OS) saves the information to memory, causing significant processing overhead.

FPU 114 can include multiple separate functional units to support floating-point and multimedia operations. The separation of execution units enables processor 100 to issue and execute multiple floating-point instructions per cycle. Source and data results are stored in a multi-entry FPU internal register file 134.

FPU internal register file 134 has, for example, 32 32-bit floating point registers, used by FPU 114 and LOAD and STORE instructions. Alternatively, FPU internal register file 134 can be used as 16 64-bit registers or 8 128-bit registers. A scalar floating-point value is returned in the floating-point registers. Like the global registers, the floating-point registers must be managed by software. Compilers use the floating-point registers for user variables and, compiler temporaries, pass floating-point parameters, and return floating-point results in them.

LSU 116 is responsible for generating the virtual address of all loads and stores, for accessing the data cache, for decoupling load misses from the pipeline through the load queue, and for decoupling the stores through a store queue. One load or one store can be issued per cycle. During context switches LOAD and STORE instructions save off internal registers to memory.

The design of processor 100 is reminiscent of that of certain SPARC architecture based processors. Note that descriptions and/or terminology consistent with the SPARC architecture are used herein purely for illustrative purposes and, based on the description herein, persons of ordinary skill in the art will appreciate exploitations of the present invention suitable for a wide variety of processor implementations and architectures. SPARC architecture based processors are available from Sun Microsystems, Inc., Palo Alto, Calif. SPARC trademarks are used under license and are trademarks or registered trademarks of SPARC International, Inc. in the United States and other countries. Products bearing SPARC trademarks are based upon an architecture developed by Sun Microsystems, Inc.

In the illustration of FIG. 1, storage for integer register file 132 and floating point register file 134 (which can, in some implementations, include renaming facilities, a reorder buffer or other out-of-order and/or speculative execution facilities) are integrated with IEU 112 and FPU 114, respectively. Other implementations can employ other forms or implementations of internal storage for architectural states. For example, all register files can be combined into one large register file. Alternatively, additional register files other than the ones illustrated here can be available. Suitable forms and internal storage implementations are architecture- and processor implementation-specific.

A register file, such as integer register file 132 or floating point register file 134, is typically a bank or set of storage units that are addressed through register identification fields in processor instructions. FIGS. 2A–2F illustrate exemplary instruction formats that provides for the addressing of various internal register sets through the use of register identification fields and in which techniques of the present invention can be employed to provide additional internal register storage in accordance with some embodiments of the present invention.

Figure 2A:
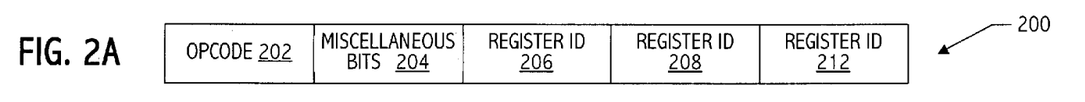
FIGS. 2A–2F illustrate exemplary instruction formats that provide for the addressing of various internal register sets and in which techniques of the present invention can be employed to provide additional internal register storage in accordance with some embodiments of the present invention.

FIG. 2A illustrates an exemplary generic instruction format. Instruction 200 has multiple fields, including an opcode 202, miscellaneous bits field 204, and register identification (ID) fields 206, 208, and 212. Opcode 202 identifies the instruction, for example, a MOVE, ADD, or a LOAD instruction. Opeodes are typically the same length across multiple instructions. Miscellaneous bits field 204 contains, for example, various instruction dependent bits or bits reserved for future instruction enhancements. For example, miscellaneous bits field 204 can contain condition codes to indicate various conditions, for example, not equal, greater than and the like, upon which if true the instruction is to be executed. Miscellaneous bits field 204 can be of varying length and are instruction dependent. Register ID field 206 identifies a particular internal register which contains a value or operand that is to be executed upon. Register ID field 208 identifies a particular internal register which contains a value or operand that is also to be executed upon. Register ID field 212 identifies a particular internal register in which the results of the instruction execution are stored. The length of register ID fields 206 is typically a fixed size, for example, the same size as register ID fields 208 and 212.

Figure 2B:
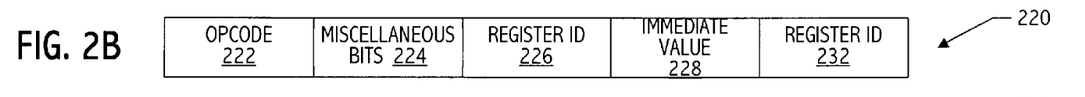

FIG. 2B illustrates another exemplary generic instruction format. Instruction 220 has multiple fields and includes an opcode 222, a miscellaneous bits field 224, register ID field 226, and register ID field 232 which are similar in functionally to opcode 202, miscellaneous bits field 204, register ID field 206, and register ID field 212, respectively, of instruction 200. Instead of an additional register ID field, instruction 220 contains an immediate value field 228 which contains a constant value which is to be executed upon. The length of immediate value field 228 can vary, for example, to be an 11, 12, or 13 bit constant, the length of which is instruction dependent.

Additional fields can be available in instruction 200 and instruction 220. Additionally, the instruction formats of FIGS. 2A and 2B are used for illustrative purposes only. Other instruction formats can be utilized in the present invention.

Figure 2C:
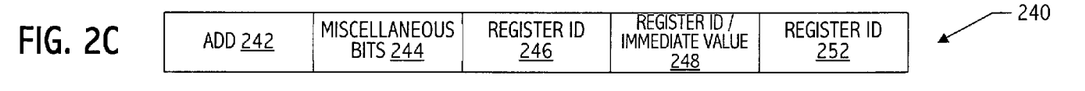
Figure 2D:
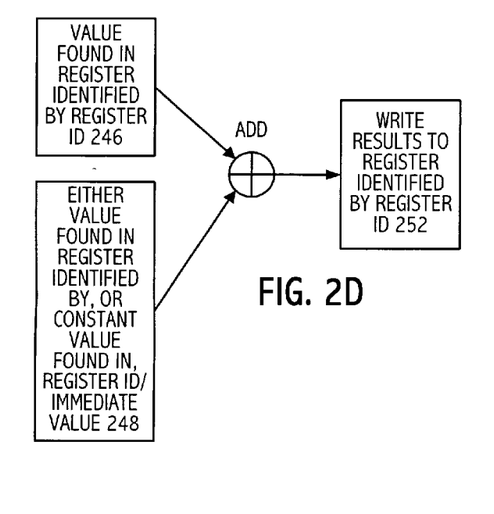

FIG. 2C illustrates an exemplary instruction format of an ADD instruction. ADD instruction 240 includes an add opcode 242, miscellaneous bits field 244, register ID field 246, register ID/immediate value field 248, and register ID field 252. FIG. 2D illustrates the execution of ADD instruction 240. The value found in the internal register identified by register ID field 246 and the value found in the internal register identified by, or the constant value found in, register ID/immediate value field 248 are added together and stored in an internal register identified by register ID field 252.

Figure 2E:
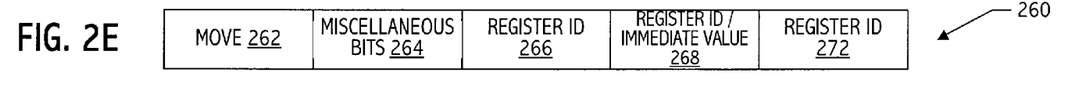
Figure 2F:
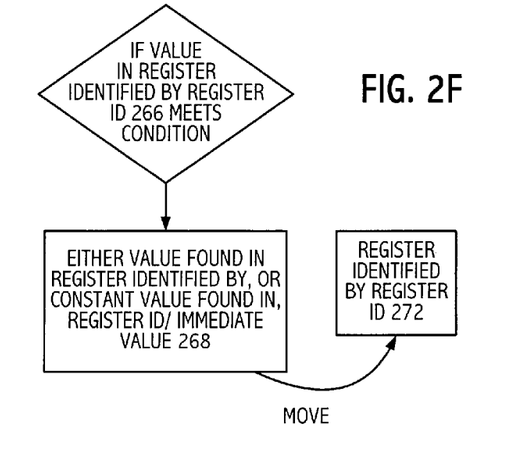

FIG. 2E illustrates the instruction format of a MOVE instruction. MOVE instruction 260 includes a move opcode 262, a miscellaneous bits field 264, a register ID field 266, a register ID/immediate value field 268, and a register ID field 272. FIG. 2F illustrates the execution of MOVE instruction 260. The value stored in the internal register identified by register ID field 266 is evaluated according to, for example, condition codes set forth in miscellaneous bits field 264. If the condition is met, either the value stored in the internal register or the constant value identified by register ID/immediate value field 268 is copied into the internal register identified by register ID field 272.

As illustrated in FIGS. 2A–2F, internal registers are accessed and identified by register identification fields in a processor instruction. A register identification field in a processor instruction uniquely identifies each internal register. For example, if there are 32 internal registers, a 5-bit field is required to address each internal register. Processor instructions typically manipulate values stored in a particular register by identifying the particular register using a register identification field.

According to the present invention, the internal registers include one or more extended registers which can hold multiple values. The values stored in the extended register cannot be randomly accessed. Instead, a processor instruction identifies the extended register utilizing an internal register identification field and accesses the values according to the storage characteristics of the extended register, for example, in the order in which the values were stored. As such, an internal register set can be expanded to hold a large amount of information without needing to increase addressing capability in the register identification field.

Figure 3:
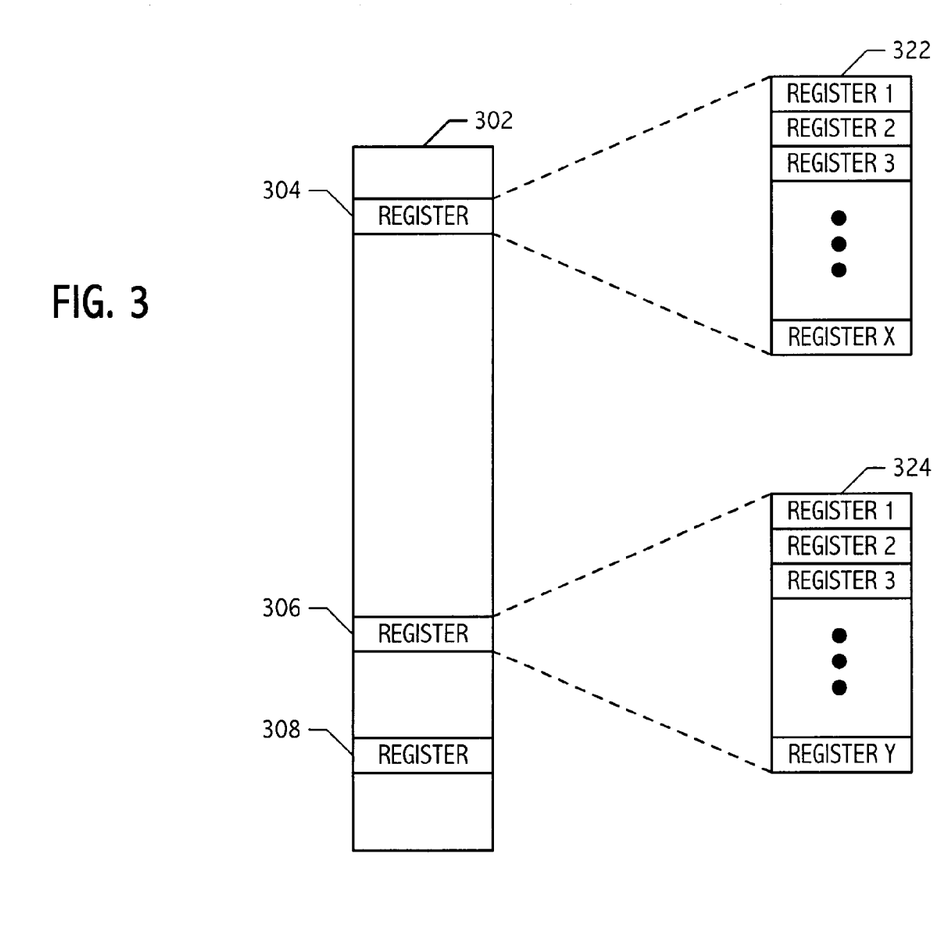
FIG. 3 illustrates a diagram of an internal register set having extended registers in accordance with some embodiments of the present invention.

FIG. 3 illustrates a diagram of an internal register set having extended registers in accordance with some embodiments of the present invention. Internal register set 302 includes multiple registers including registers 304, 306 and 308 which can be addressed utilizing a register identification field in a processor instruction. Register 304 and register 306 are extended registers and can each store multiple values. Register 304 is a set of multiple registers 322 capable of storing up to X values. Register 306 is a set of multiple registers 324 capable of storing up to Y values. Register 308 is a single register and is capable of only storing one value. Processor instructions identify register 304 utilizing a register identification field. However, the multiple values in register 304 cannot be randomly accessed and are accessed according to the order in which they are stored. Processor instructions cannot access all of the multiple storage locations at once, i.e., they cannot identify a particular register in set of registers 322, but are limited to accessing specific values, for example, the last value written or the first value written. Another processor instruction is used to remove stored values, changing the pointers to the last or first value written. According to the present invention, a register identification field does not need to be extended in order to be capable of storing more values in internal registers. In addition, the general instruction format can be utilized with extended registers. Multiple values can be stored using only a small amount of register namespace and instruction bits.

In addition to storing to and reading values from the extended register, a register operation can be used to rearrange the order of the values stored in the multiple storage locations of the extended register. For example, two values can be swapped, the Nth value can be brought to the front or top of the multiple storage locations, and so on.

Trap operations can be generated upon full or empty conditions of the extended register. For example, when all of the storage locations of the extended register are full, a trap operation can be generated. Alternatively, full and empty conditions can be used for executing conditional operations. For example, an operation can test for a full condition, and if all of the storage locations in the extended register are full, execute another operation.

Older versions of the processor instruction set that do not recognize extended registers identify the extended register as having only one storage location. According to one embodiment of the present invention, an extended register size control can be used to set the number of multiple storage locations to one prior to executing the older versions of software. Thus, the older versions of software can be executed without error.

Figure 4A:
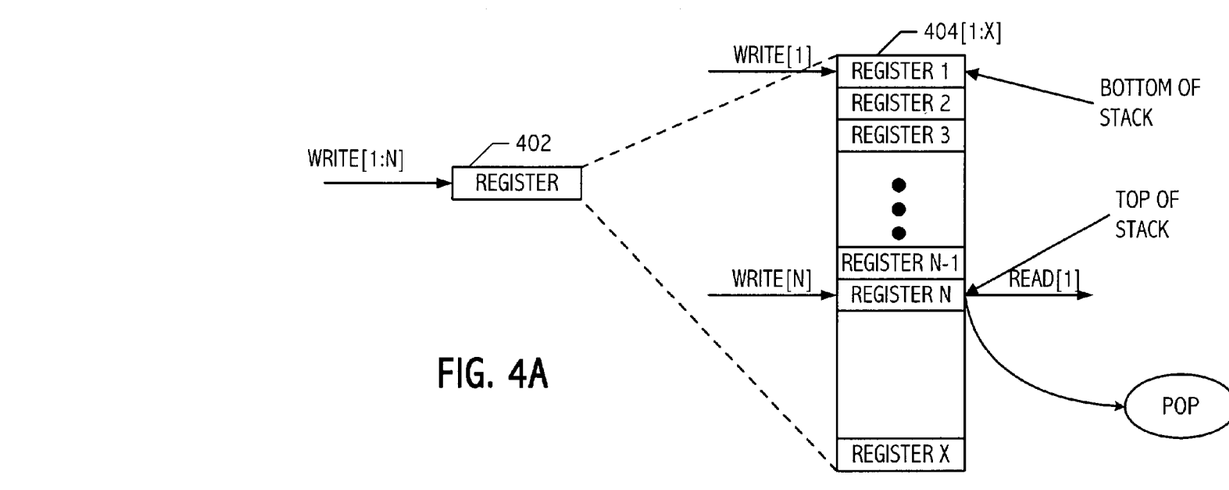
FIGS. 4A–4B illustrate an extended register that behaves like a stack or a last-in first-out (LIFO) register set in accordance with some embodiments of the present invention.

FIG. 4A illustrates an extended register that behaves like a stack or a last-in first-out (LIFO) register set in accordance with some embodiments of the present invention. Register 402 is an extended register in a set of internal registers (not shown). Register 402 is implemented as a stack register 404[1:X]. Multiple values can be written to register 402, represented by WRITE[1:N]. A write operation can be a result of a processor instruction storing a value to the extended register. For example, a MOVE instruction can move a value to the extended register or an ADD instruction can store a result in the extended register. A first write, WRITE[1] is stored in stack register 404 [1]. A second write, WRITE[2] is stored in stack register 404[2], as so on. As reads of extended register 402 occur, the last value written is the first value read. The most recently written value is at the top stack register 404. Each instruction that writes to stack register 404 pushes a value onto the top of the stack. Each instruction that reads from stack register 404 reads a value from the top of the stack without removing anything from the stack. A read operation can be a result of a processor instruction accessing a value stored in the extended register. For example, a MOVE instruction can move a value from the extended register to another location or an ADD instruction can utilize a value in the extended register as an operand.

Backward compatibility with previous versions of software is a major concern when new processor architectures and features are introduced. Previous versions of software do not identify extended register 402 as having more than one storage location and thus do not recognize the multiple previous values stored internal to register 402. Thus, previous versions of software function properly, writing a value onto the stack and reading that value later before writing another value to extended register 402.

Because a read operation does not remove a value from the stack, after writing multiple values to stack register 404, the stack can overflow. Previous versions of software can ignore this occurrence and function normally. According to an embodiment of the present invention, a "POP" instruction can be utilized to remove old values from the stack. As such, the multiple values stored in stack register 404 can be accessed. New versions may optionally choose to trap on overflow so that problems may be detected in programs explicitly using the extended register capability.

Figure 4B:
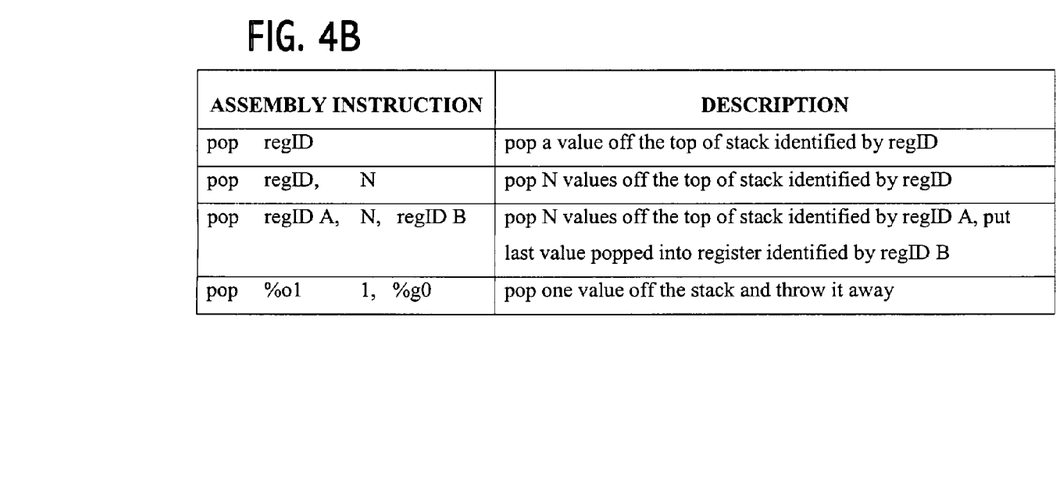

FIG. 4B illustrates various embodiments of a POP instruction that can be utilized with stack register 404. A "POP register ID" instruction can be used to pop a value off the top of the stack. As such, new code can write multiple values onto the stack and then pop off the top values to access the values below. A "POP register ID, An" instruction can be used to pop N values off the stack. This can be used in conjunction with a trap on empty capability to ensure that stack register 404 is not empty and contains at least one valid entry. A "POP register ID A, N, register ID B" instruction can be used to pop N values from the stack identified by register ID A, place the Nth value into the register identified by register ID B, and dispose of the other values from the top of the stack. In a SPARC architecture, a "POP %o1, 1,%g0" instruction would pop one value from the %o1 internal register and throw it away (%g0 internal register in the SPARC architecture always has a null value).

Stack register 404 expands the available storage in an internal register set without requiring additional addressing capability and adding only a "POP" instruction. The values stored in stack register 404 cannot be randomly accessed. However, compilers have used stacks to evaluate expressions and thus have the ability to use stack registers effectively. Existing register stack architectures have instructions that pop and operate on two elements at the top of the stack, for example register 404[N] and register 404[N−1], and write the result to the top of the stack, for example register 404[N−1]. These kinds of instructions could be added to further support the extended register set, but they would require new instructions and consume some of the limited instruction encoding space. Also, existing stack architectures often have instructions to reorder the stack elements, like a swap instruction to swap the top two elements. Again, these kinds of instructions could be added to further support the extended register set, but they would require new instructions and consume some of the limited instruction encoding space.

An internal register set can have one or more of its registers be stack registers. A stack register could have any number of registers in the stack, limited only by the cost of die area used balanced with the increased processing capability.

In SPARC architecture, the in, out and local registers utilize register windows and increase the complexity of implementing extended registers. Accordingly, the use of global registers as extended registers is preferred.

Figure 5A:
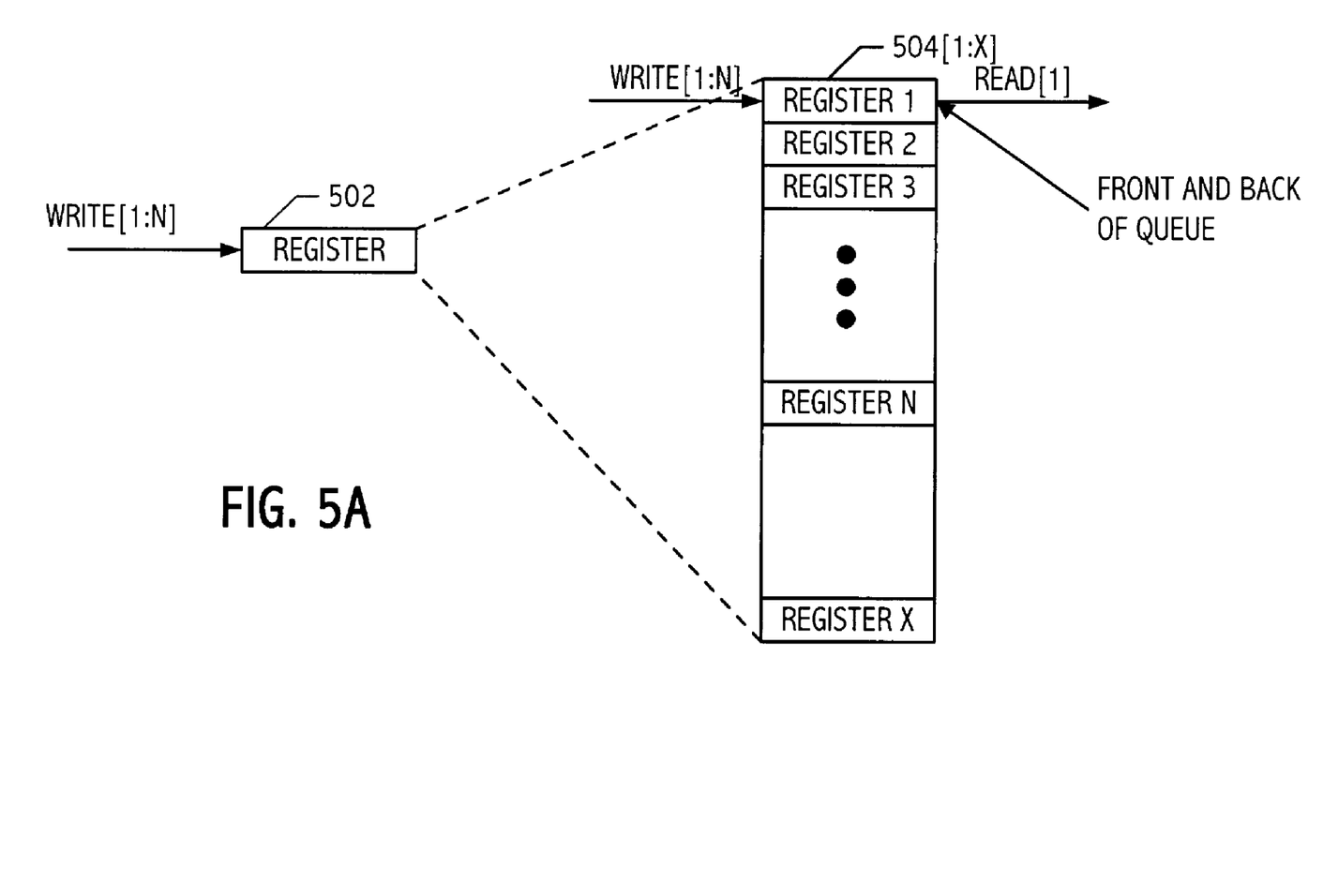
FIGS. 5A–5C illustrate the use of read and write operations by previous software revisions on an extended register that behaves like a queue or a first-in first-out (FIFO) register set in accordance with some embodiments of the present invention.

According to another embodiment of the present invention, an extended register behaves like a queue or a first-in first-out (FIFO) register set. FIG. 5A illustrates the use of read and write operations by previous software revisions on an extended register that behaves like a queue in accordance with some embodiments of the present invention. Register 502 is an extended register in a set of internal registers (not shown). Register 502 is implemented as a queue register 504[1:X]. Multiple values can be written to register 502, represented by WRITE[1:N]. A first write, WRITE[1] is stored in queue register 504[1]. Because a write instruction removes a value from the front of the queue, a second write, WRITE[2], is also stored in queue register 504[1]. Each instruction that writes to queue register 504 removes a value from the front of the queue (and throws it away), and stores the new value onto the back of the queue. Each instruction reads from the front of the queue but does not dequeue anything. As illustrated, previous versions of software uses extended register 502 as a one-value register, keeping only one value in the queue at a time.

Figures 5B, 5C:
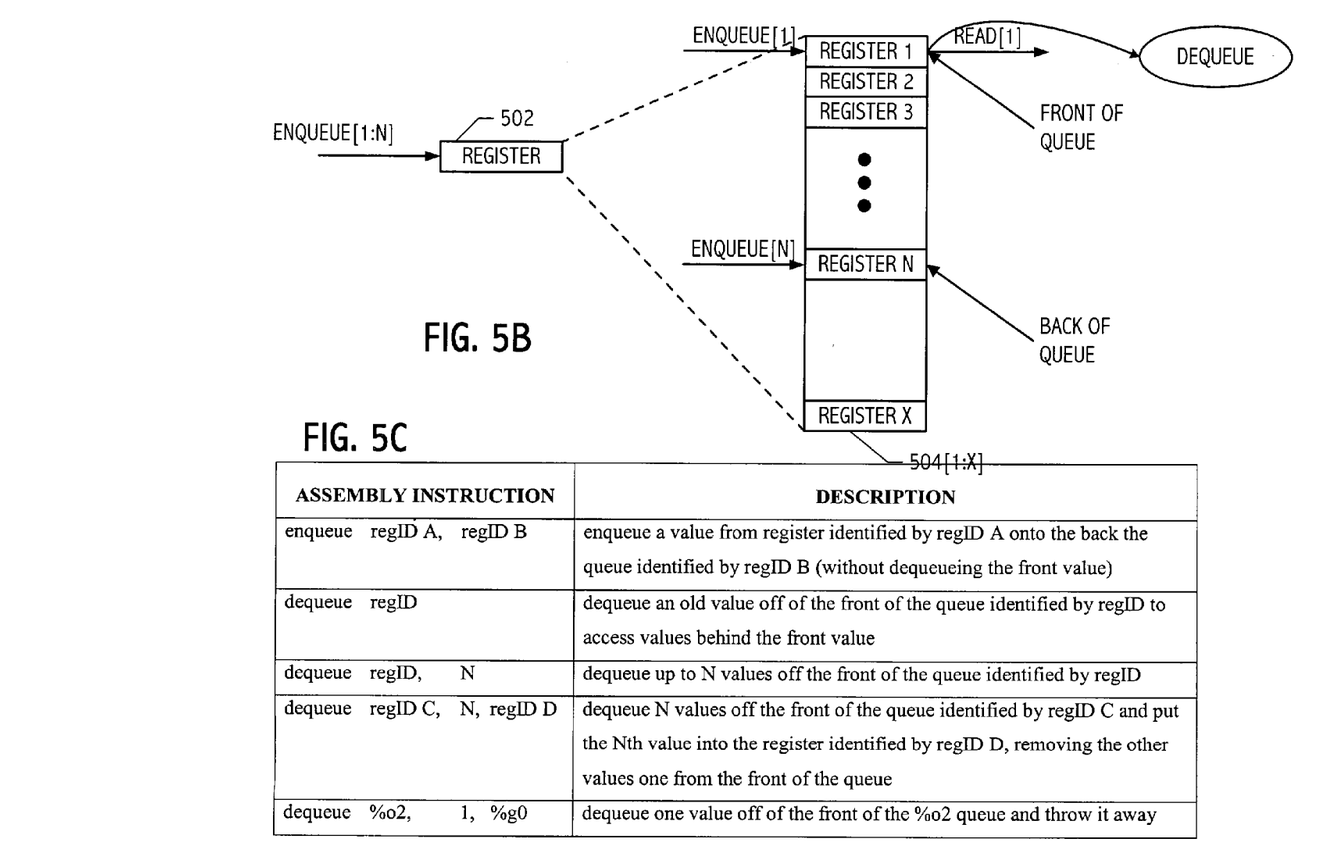

According to an embodiment of the present invention, ENQUEUE and DEQUEUE instructions are utilized to take advantage of the multiple value capability of queue register 504. FIG. 5B illustrates the use of ENQUEUE and DEQUEUE instructions on queue register 504 according to an embodiment of the present invention. Multiple values can be enqueued to register 502, represented by ENQUEUE[1:N]. A first enqueue, ENQUEUE[1] is stored in queue register 504[1]. A second write, ENQUEUE[2], is stored in queue register 504[2], and so on. The ENQUEUE instruction stores a value onto the back of queue register 504 without dequeuing the front value. The most recently written value is the back of queue register 504. As reads of extended register 502 occur, the first value written is the first value read. A DEQUEUE instruction is utilized to remove old values from queue register 504.

FIG. 5C illustrates various embodiments of an ENQUEUE instruction and a DEQUEUE instruction that can be utilized with queue register 504. An "ENQUEUE register ID A, register ID B" instruction can be used to read a value from the register identified by register ID A and enqueue it onto the back of the queue identified by register ID B (without dequeueing the front value). Thus, code utilizing queue functionality can enqueue multiple values onto queue register 504. New versions may optionally choose to trap on overflow so that problems may be detected in programs explicitly using the extended register capability. A "DEQUEUE register ID" instruction can be used to dequeue old values from the front of the queue identified by register ID to access the values behind the front value. A "DEQUEUE register ID, N" instruction can be used to dequeue N values off the front of the queue identified by register ID. This can be used in conjunction with a trap on empty capability to ensure that stack register 504 is not empty and contains at least one valid entry. A "DEQUEUE register ID C, N, Register ID D" instruction can be used to dequeue N values of the front of a queue identified by register ID C, place the Nth value into a register identified by register ID D, and dispose of the other values. In SPARC architecture, a "DEQUEUE %o1, 1, %g0" would dequeue a value from the %o1 queue and throw it away.

Queue register 504 expands the available storage an internal register set without requiring additional addressing capability and adding only a DEQUEUE and an ENQUEUE instruction. The values stored in queue register 504 cannot be randomly accessed. However, compilers have used queue-like structures called rotating register files to evaluate expressions and thus have the ability to use queue registers effectively.

An internal register set can have one or more of its registers be queue registers. A queue register could have any number of registers in the queue, limited only by the cost of die area used balanced with the increased processing capability.

In SPARC architecture, the in, out and local registers utilize register windows and increase the complexity of implementing extended registers. Accordingly, the use of global registers as extended registers is preferred.

Figure 6:
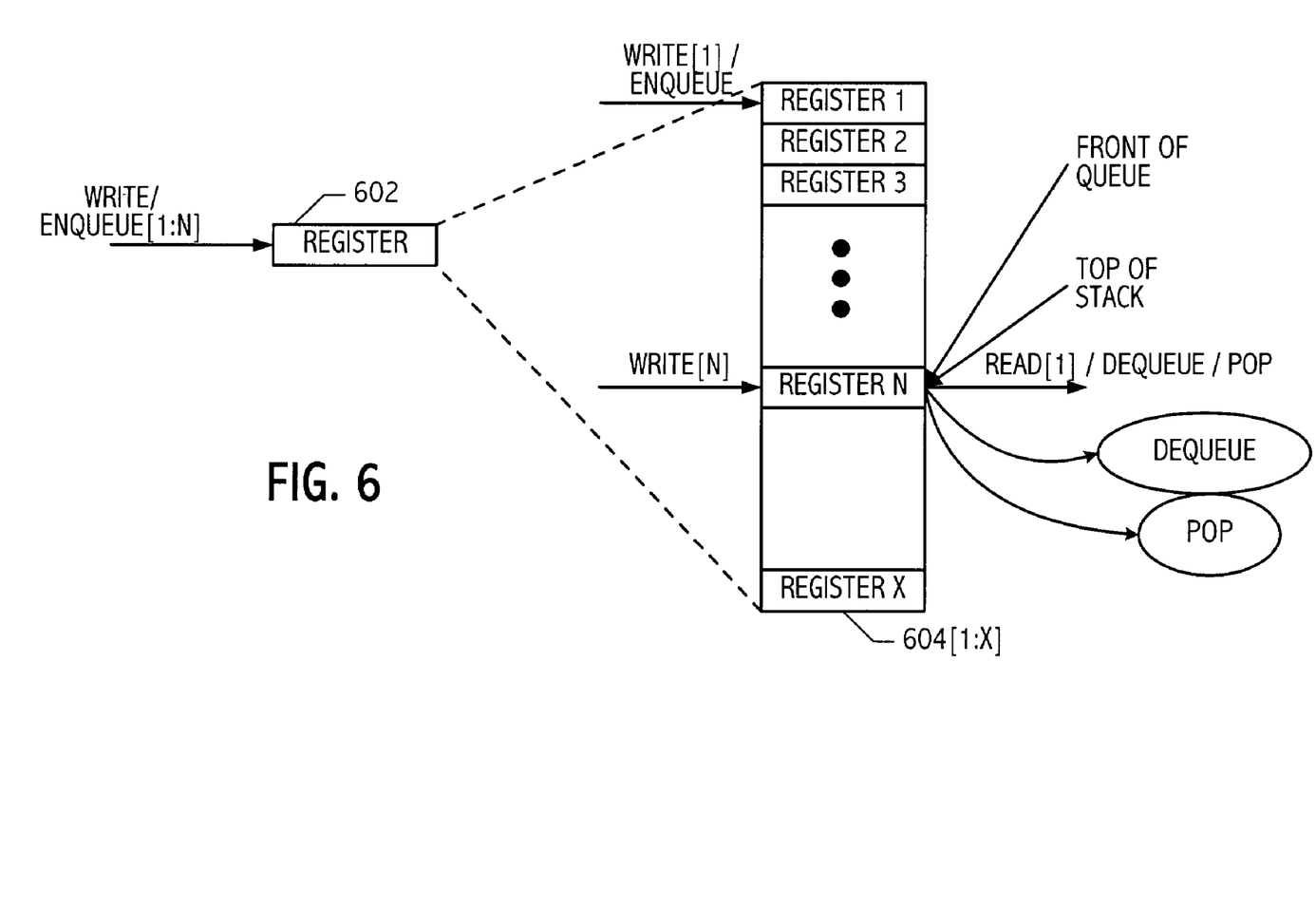
FIG. 6 illustrates an extended register that behaves both like a queue and a stack in accordance with some embodiments of the present invention.

FIG. 6 illustrates an extended register that behaves both like a queue and a stack in accordance with some embodiments of the present invention. Register 602 is an extended register in a set of internal registers (not shown). Register 602 is implemented as a mixed register 604[1:X]. Depending on the processor instruction executed, mixed register 604 functions like a stack or a queue. Multiple values can be stored to register 602 utilizing either a write operation or an ENQUEUE instruction. A first store, WRITE[1] or ENQUEUE[1] is stored in register 604[1]. A second store, WRITE[2] is stored in register 604[2]. Alternatively, a second store, ENQUEUE[2], may either store in register 604[X], or may shift the register 604[1] value to register 604[2] and store in register 604[1], depending on the implementation as a circular queue or as a shift register, respectively. Reads of extended register 702, after N writes, will read from register 604[N]. A POP instruction removes values from the top of mixed register 704, for example, mixed register 704[N], mixed register 704[N−1], and so on. A DEQUEUE instruction acts just like a POP instruction The following table illustrates the contents of mixed register 602 implemented as a circular queue/stack through a sequence of instructions according to some embodiments of the present invention.

| instruction | register contents | comments |
|---|---|---|
| | 604[1:X] <empty> | head=X, tail=X |
| mov A, reg 602 | | equivalent to push head=1, tail=X |
| | 604[1] contains A 604[2:X] <empty> | |
| add reg 602, B, reg 602 | | head=2, tail=X |
| | 604[1] contains A 604[2] contains A+B 604[3:X] <empty> | |
| enqueue C, reg 602 | | head=2, tail=X-1 |
| | 604[1] contains A 604[2] contains A+B 604[3:X-1] <empty> 604[X] contains C | |
| pop 1, reg 602 | | equivalent to dequeue head=1, tail=X-1 |
| | 604[1] contains A 604[2] <empty> 604[3:X-1] <empty> 604[X] contains C | |
| enqueue D, reg 602 | | head=1, tail=X-2 |
| | 604[1] contains A 604[2] <empty> 604[3:X-2] <empty> 604[X-1] contains D 604[X]contains C | |
| pop 2, reg 602 | | equivalent to dequeue head=X-1, tail=X-2 |
| | 604[1] <empty> 604[2] <empty> 604[3:X-2] <empty> 604[X-1] contains D 604[X] <empty> | |
| add reg 602, E, reg 602 | | head=X, tail=X-2 |
| | 604[1] <empty> 604[2] <empty> 604[3:X-2] <empty> 604[X-1] contains D 604[X] contains D+E | |

According to one embodiment of the present invention, an empty stack or queue can be used as a NaN (not a number), and can cause a trap on use. If using multiple stack or queue registers, NaN mathematics can be used. For example, a conditional BRANCH operation or a conditional MOVE operation on an empty or full stack/queue register can be provided.

According to another embodiment of the present invention, the depth of the queue or stack register can be set by software. For example, before running previous software revisions that do not recognize the extended register capability, a "QSIZE 1, register ID" instruction can be executed to set the queue size to one. Thus, each instruction that writes to the queue stores the new value onto the back of the queue. The queue can overflow losing a value at the front of the queue without causing an error condition. Each instruction that reads from the queue reads from the front of the queue, without causing a value to dequeue. Software that recognizes the extend register capability can execute a "QSIZE N, register ID" instruction to set the depth of the queue register to be capable of holding up to N values. Accordingly, queue registers and stack registers can be of varying depths according to software and processing needs.

It will be noted that the variable identifier "N" is used in the figures (and subsequent use of other variables, such as "m," "x," "k," and others) to more simply designate a constant value of a final element (e.g., stack register 404[N]) of a series of related or similar elements. The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" (or "m," "x," "k," and others) may hold the same or a different value than other instances of the same variable identifier.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor comprising:
a set of registers, each individually addressable by register operations executable on the processor using a corresponding register identification; and
a least one register of the set of registers is an extended register that has more than two storage locations, wherein the number of storage locations in the extended register that are individually enabled for write access by a single instruction is selectable between more than two settings, and wherein the number of enabled storage locations is at least one,
wherein one of the register operations rearranges an order of values stored in the more than two storage locations.

2. The processor, as recited in claim 1, wherein values stored in the more than two storage locations of the extended register are only accessible according to the order in which the values have been stored.

3. The processor, as recited in claim 1, wherein less than all of the more than two storage locations are accessible by each of the register operations.

4. The processor, as recited in claim 1, wherein one or more of the register operations identify the at least one register as having only one storage location.

5. The processor, as recited in claim 1, wherein the extended register is a stack register; wherein a sequence of values written to the stack register are stored in a plurality of the more than two storage locations such that a last value written is stored at a top of the stack register; and wherein a read of the stack register is from the top of the stack register.

6. The processor, as recited in claim 5, wherein a POP instruction is used to remove one or more values from the top of the stack register.

7. The processor, as recited in claim 5, wherein one or more of the register operations identify the stack register as having only one storage location, and wherein at least one of the one or more register operations perform a read operation from the top of the stack register and at least one other of the one or more register operations perform a write operation by pushing a value onto the top of the stack register.

8. The processor, as recited in claim 1, wherein the extended register is a queue register; wherein a sequence of values written to the queue register are stored in a plurality of the more than two storage locations such that a value enqueued to the queue register is stored at a back of the queue register and a read from the queue register is from a front of the queue register.

9. The processor, as recited in claim 8, wherein one or more of the register operations identify the queue register as having only one storage location, and wherein at least one of the one or more register operations perform a read operation from the front of the queue register and at least one other of the one or more register operations perform a write operation by dequeuing a value from the front of the queue register and storing another value at the back of the queue register.

10. The processor, as recited in claim 8, wherein an ENQUEUE instruction is used to move a value to the back of the queue register.

11. The processor, as recited in claim 8, wherein a DEQUBUE instruction is used to remove one or more values from the front of the queue register.

12. The processor, as recited in claim 1, wherein a trap operation is initiated when a read operation accesses the extended register when all of the more than two storage locations are empty.

13. The processor, as recited in claim 1, wherein a trap operation is initiated when a write operation accesses the extended register when all of the more than two storage locations are full.

14. The processor, as recited in claim 1, wherein one of the register operations tests whether all of the more than two storage locations are empty, and if so, enables a conditional execution.

15. The processor, as recited in claim 1, wherein one of the register operations tests whether all of the more than two storage locations are full, and if so, enables a conditional execution.

16. The processor, as recited in claim 1, wherein the extended register is a mixed register wherein a sequence of values written to the mixed register are stored in a plurality of the more than two storage locations such that a value written is stored at a front of the mixed register; and wherein a read of the mixed register reads the value at the front of the mixed register.

17. The processor, as recited in claim 16, wherein a DEQUBUE instruction removes one or more registers from the front of the mixed register.

18. The processor, as recited in claim 16, wherein an ENQUEUE instruction writes a value to a back of the mixed register.

19. The processor, as recited in claim 16, wherein one or more of the register operations identify the mixed register as having only one storage location, and wherein at least one of the one or more register operations perform a read operation from the front of the mixed register and at least one other of the one or more register operations perform a write operation to the front of the mixed register.

20. A processor integrated circuit operable to: in response to a first instruction, store a first value in a register in a set of registers, the set of registers each individually addressable by register operations executable on the processor using a corresponding register identification; and
   in response to a second instruction, store a second value in the register;
   wherein the register has more than two storage locations, wherein values stored in the more than two storage locations of the register are accessed according to the order in which the values have been stored,
   wherein one of the register operations rearranges an order of values stored in the more than two storage locations; and
   wherein the number of storage locations in the register that are individually enabled for write access by a single instruction is selectable between more than two settings, and wherein the number of enabled storage locations is at least one.

21. The processor, as recited in claim 20, wherein less than all of the more than two storage locations are accessible by each of the register operations.

22. The processor, as recited in claim 20, wherein one or more of the register operations identify the register as having only one storage location.

23. The processor, as recited in claim 20, wherein the register is a stack register; wherein a sequence of values written to the stack register are stored in a plurality of the more than two storage locations such that a last value written is stored at a top of the stack register; and wherein a read of the stack register is from the top of the stack register.

24. The processor, as recited in claim 20, wherein the register is a queue register; wherein a sequence of values written to the queue register are stored in a plurality of the more than two storage locations such that a value enqueued to the queue register is stored at a back of the queue register and a read from the queue register is from a front of the queue register.

25. The processor, as recited in claim 20, wherein a trap operation is initiated when a read operation accesses the register when all of the more than two storage locations are empty.

26. The processor, as recited in claim 20, wherein one of the register operations tests whether all of the more than two storage locations are full, and if so, enables a conditional execution.

27. The processor, as recited in claim 20, wherein the register is a mixed register wherein a sequence of values written to the mixed register are stored in a plurality of the multiple more than two storage locations such that a value written is stored at a front of the mixed register; and wherein a read of the mixed register reads the value at the front of the mixed register.

28. A code preparation tool encoded as software executable code, stored on computer readable storage media, configured to:
   store a first value in a register in a set of registers, the set of registers each individually addressable by register operations executable on the processor using a corresponding register identification; and
   store a second value in the register;
   wherein the register has more than two storage locations, wherein values stored in the more than two storage locations of the register are accessed according to the order in which the values have been stored,
   wherein one of the register operations rearranges an order of values stored in the more than two storage locations; and
   wherein the number of storage locations in the register that are individually enabled for write access by a single instruction is selectable between more than two settings, and wherein the number of enabled storage locations is at least one.

29. The code preparation tool, as recited in claim 28, wherein less than all of the more than two storage Locations are accessible by each of the register operations.

30. The code preparation tool, as recited in claim 28, wherein one or more of the register operations identify the register as having only one storage location.

31. The code preparation tool, as recited in claim 28, wherein the register is a stack register; wherein a sequence of values written to the stack register are stored in a plurality of the more than two storage locations such that a last value written is stored at a top of the stack register; and wherein a read of the stack register is from the top of the stack register.

32. The code preparation tool, as recited in claim 28, wherein the register is a queue register; wherein a sequence of values written to the queue register are stored in a plurality of the more than two storage locations such that a value enqueued to the queue register is stored at a back of the queue register and a read from the queue register is from a front of the queue register.

33. The code preparation tool, as recited in claim 28, wherein a trap operation is initiated when a read operation accesses the register when all of the more than two storage locations are empty.

34. The code preparation tool, as recited in claim 28, wherein one of the register operations tests whether all of the more than two storage locations are full, and if so, enables a conditional execution.

35. The code preparation tool, as recited in claim 28, wherein the register is a mixed register wherein a sequence of values written to the mixed register are stored in a plurality of the more than two storage locations such that a value written is stored at a front of the mixed register; and wherein a read of the mixed register reads the value at the front of the mixed register.

36. Software encoded in one or more computer readable storage media, the software, comprising:
a sequence of instructions executable on a processor,
the sequence including one or more executable instructions that address a particular register of the processor and operate on a value stored therein,
wherein at least one of the executable instructions directs the processor to store a first value in a register in a set of registers, the set of registers each individually addressable by register operations executable on the processor using a corresponding register identification; and
at least another one of the executable instructions directs the processor store a second value in the register;
wherein the register has more than two storage locations, wherein values stored in the more than two storage locations of the register are accessed according to the order in which the values have been stored
wherein one of the register operations rearranges an order of values stored in the more than two storage locations; and
wherein the number of storage locations in the register that are individually enabled for write access by a single instruction is selectable between more than two settings, and wherein the number of enabled storage locations is at least one.

37. The software, as recited in claim 36, wherein less than all of the more than two storage locations are accessible by each of the register operations.

38. The software, as recited in claim 36, wherein one or more of the register operations identify the register as having only one storage location.

39. The software, as recited in claim 36, wherein the register is a stack register; wherein a sequence of values written to the stack register are stored in a plurality of the more than two storage locations such that a last value written is stored at a top of the stack register; and wherein a read of the stack register is from the top of the stack register.

40. The software, as recited in claim 36, wherein the register is a queue register; wherein a sequence of values written to the queue register are stored in a plurality of the more than two storage locations such that a value enqueued to the queue register is stored at a back of the queue register and a read from the queue register is from a front of the queue register.

41. The software, as recited in claim 36, wherein a trap operation is initiated when a read operation accesses the register when all of the more than two storage locations are empty.

42. The software, as recited in claim 36, wherein one of the register operations tests whether all of the more than two storage locations are full, and if so, enables a conditional execution.

43. The software, as recited in claim 36, wherein the register is a mixed register wherein a sequence of values written to the mixed register are stored in a plurality of the more than two storage locations such that a value written is stored at a front of the mixed register; and wherein a read of the mixed register reads the value at the front of the mixed register.

44. A method of making a processor comprising:
during fabrication of an integrated circuit defining thereon a set of registers, each individually addressable by register operation executable on the processor using a corresponding register identification; and
at least one register of the set of registers is an extended register that has more than two storage locations, wherein the number of storage locations in the extended register that are individually enabled for write access by a single instruction is selectable between more than two settings, and wherein the number of enabled storage locations is at least one,
wherein one of the register operations rearranges an order of values store in the more than two storage locations.

45. The method, as recited in claim 44, wherein the set of registers is defined such that values stored in the more than two storage locations of the extended register are only accessible according to the order in which the values have been stored.

46. The method, as recited in claim 44, wherein the set of registers is defined such that less than all of the more than two storage locations are accessible by each of the register operations.

47. The method, as recited in claim 44, wherein the set of registers is defined such that one or more of the register operations identify the at least one register as having only one storage location.

48. The method, as recited in claim 44, wherein the extended register is a stack register; wherein the set of registers is defined such that a sequence of values written to the stack register are stored in a plurality of the more than two storage locations such that a last value written is stored at a top of the stack register; and wherein the set of registers is defined such that a read of the stack register is from the top of the stack register.

49. The method, as recited in claim 44, wherein the extended register is a queue register; wherein the set of registers is defined such that a sequence of values written to the queue register are stored in a plurality of the more than two storage locations such that a value enqueued to the queue register is stored at a back of the queue register and a read from the queue register is from a front of the queue register.

50. The method, as recited in claim 44, wherein the set of registers is defined such that one of the register operations tests whether all of the more than two storage locations are full, and if so, enables a conditional execution.

51. The method, as recited in claim 44, wherein the extended register is a mixed register; wherein the set of registers is defined such that a sequence of values written to the mixed register are stored in a plurality of the more than two storage locations such that a value written is stored at a front of the mixed register; and wherein the set of registers is defined such that a read of the mixed register reads the value at the front of the mixed register.

52. The method, as recited in claim 44, wherein a trap operation is initiated when a read operation accesses the extended register when all of the more than two storage locations are empty.

53. The processor of claim 1, wherein the rearranging one of the register operations is executable to swap values in at least two different ones of the more than two storage locations in the extended register.

54. The processor integrated circuit of claim 20, wherein the rearranging one of the register operations is executable to swap values in at least two different ones of the more than two storage locations in the extended register.

55. The code preparation tool of claim 28, wherein the rearranging one of the register operations is executable to swap values in at least two different ones of the more than two storage locations in the extended register.

56. The software of claim 36, wherein the rearranging one of the register operations is executable to swap values in at least two different ones of the more than two storage locations in the extended register.

57. The method of claim 44, wherein the set of registers is defined such that the rearranging one of the register operations is executable to swap values in at least two different ones of the more than two storage locations in the extended register.

58. The processor, as recited in claim 1, further comprising an extended register size control register that is at least two bits, wherein the number of storage locations in the extended register that are enabled for access is selected by writing a value into the extended register size control register.

59. The processor, as recited in claim 58, wherein the extended register control register can be set to at least three settings, and wherein the at least three settings include: enabling access to a single storage location of the extended register, enabling access to all the storage locations of the extended register, and enabling access to at least two but less than all of the storage locations of the extended register.

60. The processor integrated circuit of claim 20, wherein the number of storage locations in the register that are enabled for access is selected by writing a value into an extended register size control register, and wherein the extended register size control register is at least two bits.

61. The code preparation tool of claim 28, wherein the number of storage locations in the register that are enabled for access is selected by writing a value into an extended register size control register, and wherein the extended register size control register is at least two bits.

62. The software of claim 36, wherein the number of storage locations in the register that are enabled for access is selected by writing a value into an extended register size control register, and wherein the extended register size control register is at least two bits.

63. The method of claim 44, wherein the number of storage locations in the extended register that are enabled for access is selected by writing a value into an extended register size control register, and wherein the extended register size control register is at least two bits.

* * * * *

UNITED STATES PATENT AND TRADEMARK OFFICE
CERTIFICATE OF CORRECTION

PATENT NO.         : 7,203,820 B2
APPLICATION NO. : 10/185200
DATED               : April 10, 2007
INVENTOR(S)       : Damron It is certified that error appears in the above-identified patent and that said Letters Patent is hereby corrected as shown below:

In column 6, line 16, delete "Opeodes" and insert -- Opcodes --, therefor.

In column 8, line 56, after "register ID," delete "An" and insert -- N --, therefor.

In column 13, line 18, in Claim 11, delete "DEQUBUE" and insert -- DEQUEUE --, therefor.

In column 13, line 44, in Claim 17, delete "DEQUBUE" and insert -- DEQUEUE --, therefor.

In column 14, line 40, in Claim 27, delete "multiple" before "more".

In column 14, line 66, in Claim 29, after "storage" delete "Locations" and insert -- locations --, therefor.

Signed and Sealed this

Twelfth Day of June, 2007

JON W. DUDAS
*Director of the United States Patent and Trademark Office*